United States Patent
Jain et al.

(10) Patent No.: US 10,545,999 B2
(45) Date of Patent: *Jan. 28, 2020

(54) BUILDING FEATURES AND INDEXING FOR KNOWLEDGE-BASED MATCHING

(71) Applicant: Microsoft Technology Licensing, LLC, Redmond, WA (US)

(72) Inventors: Navendu Jain, Seattle, WA (US); Luhui Hu, Bellevue, WA (US); Liyuan Zhang, Redmond, WA (US); Rahul Potharaju, West Lafayette, IN (US); Vitaly Voloshin, Sammamish, WA (US); Mingshi Wang, Bellevue, WA (US); Joseph K. W. Chan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 362 days.

This patent is subject to a terminal disclaimer.

(21) Appl. No.: 15/614,338

(22) Filed: Jun. 5, 2017

(65) Prior Publication Data

US 2017/0270188 A1    Sep. 21, 2017

Related U.S. Application Data

(63) Continuation of application No. 14/106,762, filed on Dec. 14, 2013, now Pat. No. 9,684,709.

(51) Int. Cl.
*G06F 16/00* (2019.01)
*G06F 16/31* (2019.01)
(Continued)

(52) U.S. Cl.
CPC .......... *G06F 16/31* (2019.01); *G06F 11/0793* (2013.01); *G06F 16/313* (2019.01); *G06F 16/335* (2019.01); *G06Q 10/20* (2013.01)

(58) Field of Classification Search
CPC ...... G06F 16/31; G06F 16/313; G06F 16/335; G06F 11/0793; G06Q 10/20
(Continued)

(56) References Cited

U.S. PATENT DOCUMENTS 6,374,241 B1    4/2002  Lamburt et al.
6,460,043 B1 *  10/2002  Tabbara .............. G06F 16/2452
(Continued)

FOREIGN PATENT DOCUMENTS

CN       101482875 A       7/2009

OTHER PUBLICATIONS

"Office Action Issued in European Patent Application No. 14821964.5", dated Nov. 6, 2018, 4 Pages.
(Continued)

*Primary Examiner* — Monica M Pyo
(74) *Attorney, Agent, or Firm* — Workman Nydegger (57) ABSTRACT

Disclosed herein is a system and method for generating an enhanced index for documents contained in a knowledge base. Documents or configuration snapshots are tokenized and then passed through a number of filters. The filters modify the token stream to generate an enhanced token stream for the document by removing words from the stream and adding domain level knowledge to the tokens in the stream. The token stream is then added to the index for the document so that searches can be completed against the knowledge base when searches are generated from configuration snapshots or from inputted search queries.

22 Claims, 5 Drawing Sheets

(51) Int. Cl.
  *G06F 16/335* (2019.01)
  *G06F 11/07* (2006.01)
  *G06Q 10/00* (2012.01)

(58) Field of Classification Search
  USPC .................................. 707/742, 748; 714/26
  See application file for complete search history.

(56) References Cited

U.S. PATENT DOCUMENTS

| | | | |
|---|---|---|---|
| 6,819,325 B2* | 11/2004 | Boyd | G06T 15/00 345/426 |
| 8,055,669 B1 | 11/2011 | Singhal et al. | |
| 2002/0112058 A1* | 8/2002 | Weisman | G06F 9/4411 709/227 |
| 2003/0140179 A1* | 7/2003 | Wilt | G06F 9/3851 719/321 |
| 2003/0225756 A1 | 12/2003 | Liu | |
| 2005/0071333 A1 | 3/2005 | Mayfield et al. | |
| 2006/0089926 A1 | 4/2006 | Knepper et al. | |
| 2007/0073651 A1 | 3/2007 | Imielinski | |
| 2007/0156677 A1 | 7/2007 | Szabo | |
| 2008/0208820 A1 | 8/2008 | Usey et al. | |
| 2008/0263032 A1 | 10/2008 | Vailaya et al. | |
| 2008/0288266 A1 | 11/2008 | Diao et al. | |
| 2009/0006619 A1 | 1/2009 | Mohammed et al. | |
| 2009/0306962 A1 | 12/2009 | Harlow et al. | |
| 2010/0088672 A1* | 4/2010 | Langworthy | G06F 8/31 717/109 |
| 2011/0099164 A1 | 4/2011 | Mayfield et al. | |
| 2011/0270883 A1 | 11/2011 | Bukai et al. | |
| 2012/0005219 A1 | 1/2012 | Apacible et al. | |
| 2012/0077178 A1 | 3/2012 | Bagchi et al. | |
| 2015/0169582 A1 | 6/2015 | Jain et al. | |
| 2015/0169734 A1 | 6/2015 | Jain et al. | |

OTHER PUBLICATIONS

"First Office Action and Search Report Issued in Chinese Patent Application No. 201480068039.5", dated Sep. 30, 2018, 15 pages.
"First Office Action and Search Report Issued in Chinese Patent Application No. 201480068127.5", dated Oct. 18, 2018, 13 Pages.
"Final Office Action Issued in U.S. Appl. No. 14/106,762", dated Nov. 4, 2016, 12 Pages.
"Non-Final Office Action Issued in U.S. Appl. No. 14/106,762", dated May 6, 2016, 11 Pages.
"Notice of Allowance Issued in U.S. Appl. No. 14/106,762", dated Feb. 22, 2017, 15 Pages.
"Non-Final Office Action Issued in U.S. Appl. No. 14/106,763", dated Nov. 25, 2016, 30 Pages.
Meng, et al., "Building Efficient and Effective Metasearch Engines", In Journal of ACM Computing Surveys, vol. 34 Issue 1, Mar. 1, 2002, pp. 49-89.
"International Preliminary Report on Patentability Issued in PCT Application No. PCT/US2014/069173", dated Apr. 13, 2016, 9 Pages.
"International Search Report and Written Opinion Issued in PCT Patent Application No. PCT/US2014/069173", dated Apr. 9, 2015, 14 Pages.
"Second Written Opinion Issued in PCT Application No. PCT/US2014/069173", dated Jan. 8, 2016, 8 Pages.
"International Preliminary Report on Patentability Issued in PCT Application No. PCT/US2014/069174", dated Mar. 11, 2016, 7 Pages.
"International Search Report and Written Opinion Issued in PCT Application No. PCT/US2014/069174", dated Mar. 25, 2015, 10 Pages.
"Second Written Opinion Issued in PCT Application No. PCT/US2014/069174", dated Nov. 12, 2015, 6 Pages.
Saha, et al., "Improving Bug Localization using Structured Information Retrieval", In IEEE/ACM 28th International Conference on Automated Software Engineering, Nov. 11, 2013, pp. 345-355.
Woods, William A., "Conceptual Indexing: A Better Way to Organize Knowledge", In Sun Microsystems Laboratories Technical Report, Apr. 1, 1997, 99 Pages.
Notice of Allowance dated Jun. 2, 2017 cited in U.S. Appl. No. 14/106,763 (Copy Attached).
Second Office Action and Search Report Issued in Chinese Patent Application No. 201480068127.5 dated Aug. 5, 2019, 14 Pages.
"Web Application Development", Published by Beijing Institute of Technology Press, Apr. 30, 2010, 16 Pages.

* cited by examiner

BUILDING FEATURES AND INDEXING FOR KNOWLEDGE-BASED MATCHING

CROSS REFERENCE TO RELATED APPLICATIONS

This application is a continuation of U.S. patent application Ser. No. 14/106,762 filed on Dec. 14, 2013, entitled "BUILDING FEATURES AND INDEXING FOR KNOWLEDGE-BASED MATCHING" which application is expressly incorporated herein by reference in its entirety. This application is also related to U.S. patent application Ser. No. 14/106,763 entitled "QUERY TECHNIQUES AND RANKING RESULTS FOR KNOWLEDGE-BASED MATCHING", filed Dec. 14, 2013 by Navendu Jain, et al., the entire contents of which are hereby incorporated by reference for all they teach and contain.

TECHNICAL FIELD

This description relates generally to generation of an enhanced index for documents or articles contained in a knowledge base.

BACKGROUND

Consumers of software applications typically have problems associated with the software come up. These problems range from configuration errors to system crashes. When the consumer encounters these type of problems they usually first try to find a solution to the problem by consulting with a search engine. The search engine aims to find relevant documents from an index that was created by crawling through web documents, discussion boards, email threads, software manuals and other publicly available documents. If the search engine does not provide adequate results the consumer will typically call a customer support service. When dealing with customer support, an customer support representative or engineer tries to match the reported problem with information contained in a knowledge base database e.g., by searching the database or using a classification schema. This approach allows the customer support staff to provide the user with the expert written facts and rules to solve the customer's problem.

However, the customer support service using humans is extremely costly for companies to provide. Second, this approach risks significant wait times when a large number of customers call the call center at once or within a short time window. This typically occurs, for example, when a new feature is released or a faulty software patch ends up causing new problems on the customer machine. Third, this approach to troubleshooting is dependent on the expert defined rules in the database that risk incompleteness or become outdated as the software evolves. Finally, this approach only solves the problem that is reported or presented by the customer to the customer support but does not identify other potentially related problems such as the need to apply a specific security patch.

Search engines such as Google and Bing have been optimized to output highly relevant results for a given query. However, their techniques focus on text-based matching of the query terms or its extensions such as spell correction or changing the order of terms to enable matching of relevant documents. This approach makes it difficult to correctly identify and analyze configuration errors based on the information contained in the articles (e.g., technical solutions) in the knowledge base. This is because these articles are written in natural language text, they are highly domain-specific, and they often use abbreviations and synonyms for technical words and also may describe conditional constraints on the configuration parameters and values in the specific documents that indicate configurations where the document is relevant and where it is not relevant. As such the problem or error reported/presented by the consumer may not be easily searchable in the knowledge base articles.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for generating an enhanced index for documents contained in a knowledge base. The system takes a document and generates an enhanced index for the document by passing the document through one or more filters in an analyzer. The analyzer adds, modifies or removes terms from the token stream for the document. The analyzer can add synonyms for technical terms to the token stream or recognize that two or more words that appear to be separate words actually identify a specific software entity. The analyzer can determine that a number appearing in a string is not just a number but refers to a specific version. The token stream is then added to the index for the document so that searches can be completed against the knowledge base when searches are generated from configuration snapshots or from inputted search queries.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
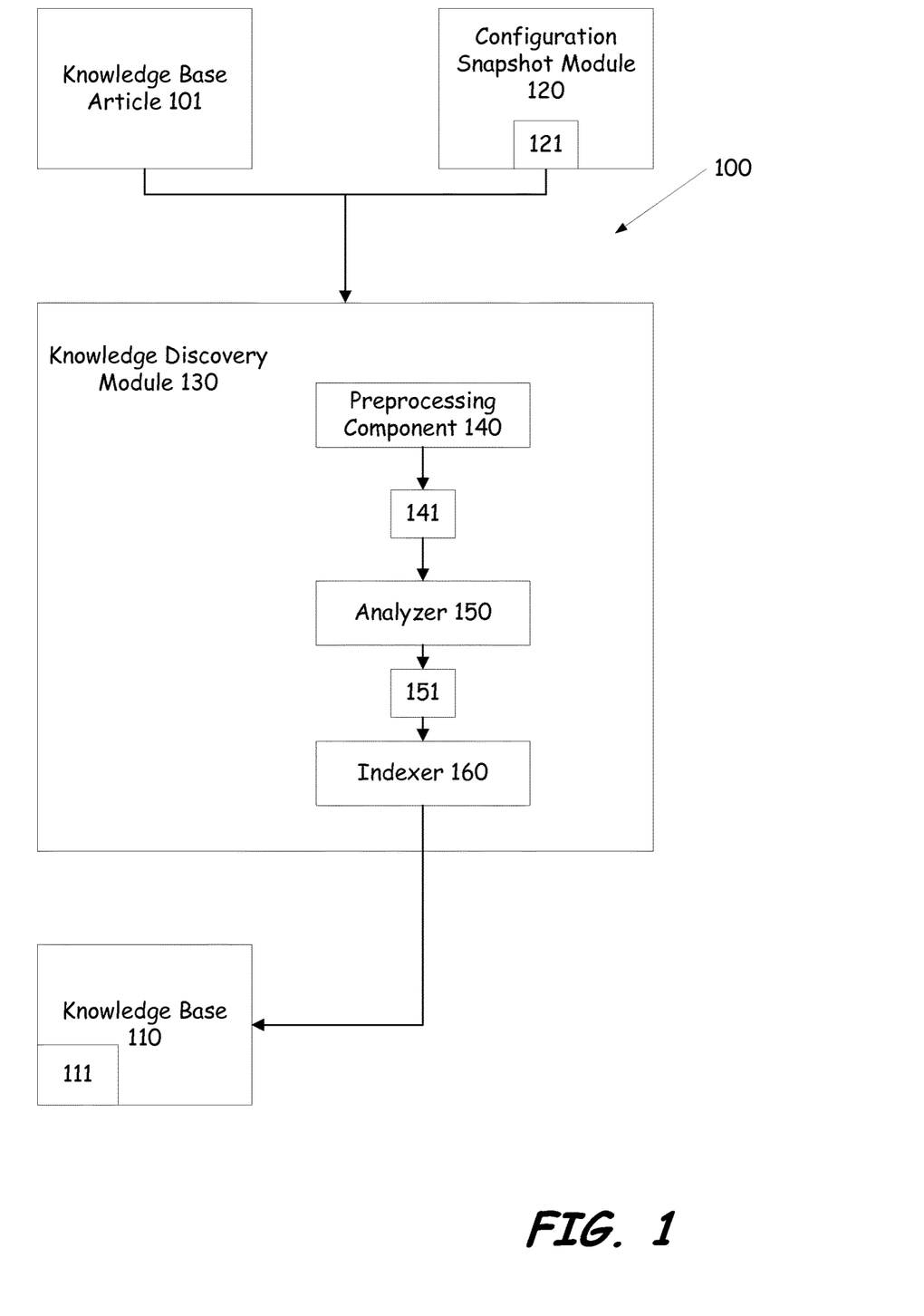
FIG. 1 is a block diagram illustrating components of the enhanced indexing system according to one illustrative embodiment.

FIG. 1 is a block diagram illustrating the components of the indexing system 100 according to one illustrative embodiment of the present disclosure. System 100 includes a plurality of knowledge based articles or documents 101, a knowledge base 110, an optional configuration snapshot module 120, and a knowledge discovery module 130.

Knowledge base 110 is in one embodiment a database or other data repository that stores articles or documents 101 related to a specified knowledge base. For example, the knowledge base 110 may contain a plurality of articles related to a specific computer software product, such as SQL Server or Microsoft Word, a computing system in general, or any other topic where knowledge based articles and documents may be produced or consumed, this may further include documents that were created by customer service persons during the reporting or assistance with an incident. In some embodiments knowledge base 110 may hold knowledge based articles for multiple different topics or related to many different products. The documents 101 held in the knowledge base 110 are indexed in index 111 in such a way as to allow the documents to be accessed quickly by a search engine or other query delivery system. Documents or articles can also include feeds from social media sites or from online forums. Index 111 provides a mapping for each document in the knowledge base 110 to a list of associated features for the document or when the index 111 is an inverted index from each feature to its associated document or documents.

Configuration snapshot module 120 is a module that is configured to take snapshots of configuration files of a software product or computer system that has been deployed. The configuration snapshot module 120 can use these snapshots 121 to generate example knowledge based documents that can be associated with knowledge based articles to return corresponding information to a user. These snapshots 121 can be stored in the knowledge base 110 and are processed and indexed in the same manner as a knowledge based document 101. Additionally, the snapshots 121 can be used to add additional knowledge to the knowledge discovery module 130 regarding specific domain level terms or issues.

Knowledge discovery module 130 in one embodiment includes a preprocessing component 140 an analyzer 150 and an indexer 160. Preprocessing component 140 is configured to take an article, such as article 101 and convert the article in to a format that can be used by the analyzer 150 to create an index of terms for the article. The preprocessing component 140 implements a variety of parsers that are suitable for a variety of document formats such as XML, HTML, CSV and plain text. In one embodiment the preprocessing component removes from the article any HTML tags or other embedded content in the article that is not related to the article itself. However, in order to address the issue of losing some of the content that may appear in the document due to the striping of, for example the HTML tags, the preprocessing component 140 flattens the input file by converting regular text in the document as it appears. However in instances where the document contains a table or graph that can be expressed in a linear fashion the preprocessing component 140 converts the table into a format such as an array of key value pairs where, in the case of table, each row is converted into a key-value pair with the key representing the column name and the value denoting the associated information in that row. By using this transformation approach it is possible to ensure that the semantic information contained in the table is propagated in to the document in a manner that permits the table itself to be later indexed.

In other embodiments the preprocessing component 140 can extract symptoms or conditions from a configuration snapshot that was obtained from the configuration snapshot module 120 and contained in a snapshot 121. In some embodiments, the preprocessing component 140 can determine the subject matter of the associated document. In yet another embodiment the preprocessing component 140 can determine if the article is an article about a cause of a problem or a resolution to the problem. Articles and documents about the causes of problems that may not have a fixed solution for the end user still may be of value to that end user to understanding a particular situation that they are encountering. Conversely resolutions are useful for end users to know about. In this way they know if the problem itself has been solved or not. For example, a customer service representative may generate a work ticket for a problem that hasn't been solved yet or a user may post a question in an online knowledge base such as the Microsoft Developer Network (MSDN). This ticket may enter into the knowledge base of articles as an unresolved problem. Thus, the ability to tell if the article is resolved or unresolved may be of importance to a person using the knowledge base system in that it provides them with information as to how to move forward with their own systems. A preprocessed document 141 is output from the preprocessing component 140. However, in other embodiments the documents may be provided directly to the analyzer 150 without passing through the preprocessing component 150.

Figure 2A:
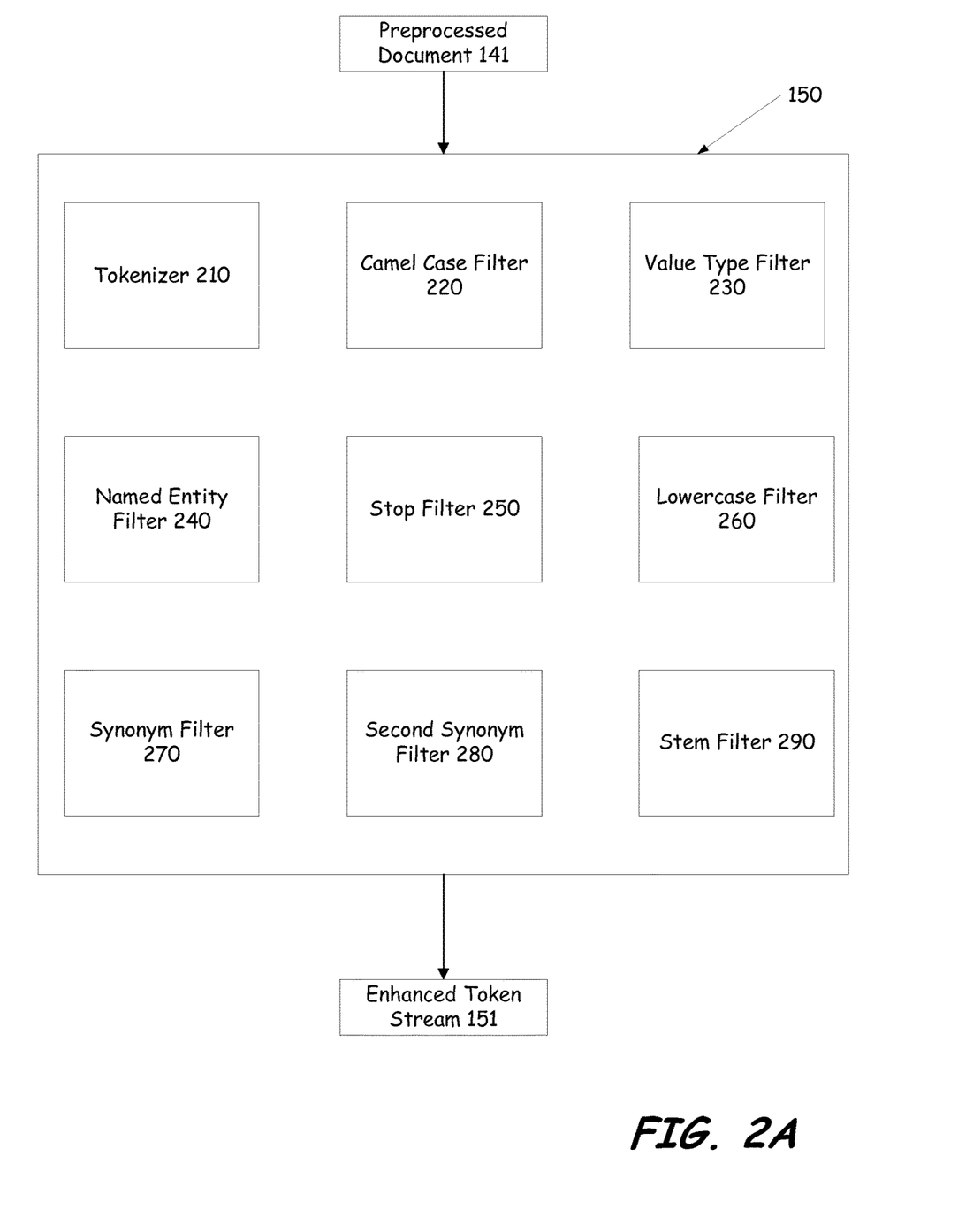
FIG. 2A is a block diagram illustrating an analyzer using a number of filters to generate the enhanced index according to one illustrative embodiment.

The analyzer 150 receives from the preprocessing component the preprocessed document 141. The analyzer 150 passes the document through a number of filters in order to generate the terms that will be used for indexing the document. FIG. 2 is a block diagram illustrating a variety of filters that may be present in the analyzer 150 for identifying terms for use in the document's index. It should be noted that various embodiments of the present disclosure may have different filters present, different numbers of filters, and the filters may be applied in different orders. A developer has the ability to pick and choose which of the filters illustrated in FIG. 2 are applicable or usable by the indexing system. As such any number or combinations of the filters may be present.

FIG. 2A is a block diagram illustrating the various filters that can be present in the analyzer 150 and may be used by the system in the process of generating the token index for the article. Analyzer 150 may include a tokenizer 210, a Camel Case Filter 220, a value type filter 230, a named-entity filter 240, a stop filter 250, a lower case filter 260, a synonym filter 270, a second synonym filter 280, and a stem filter 290.

Figure 2B:
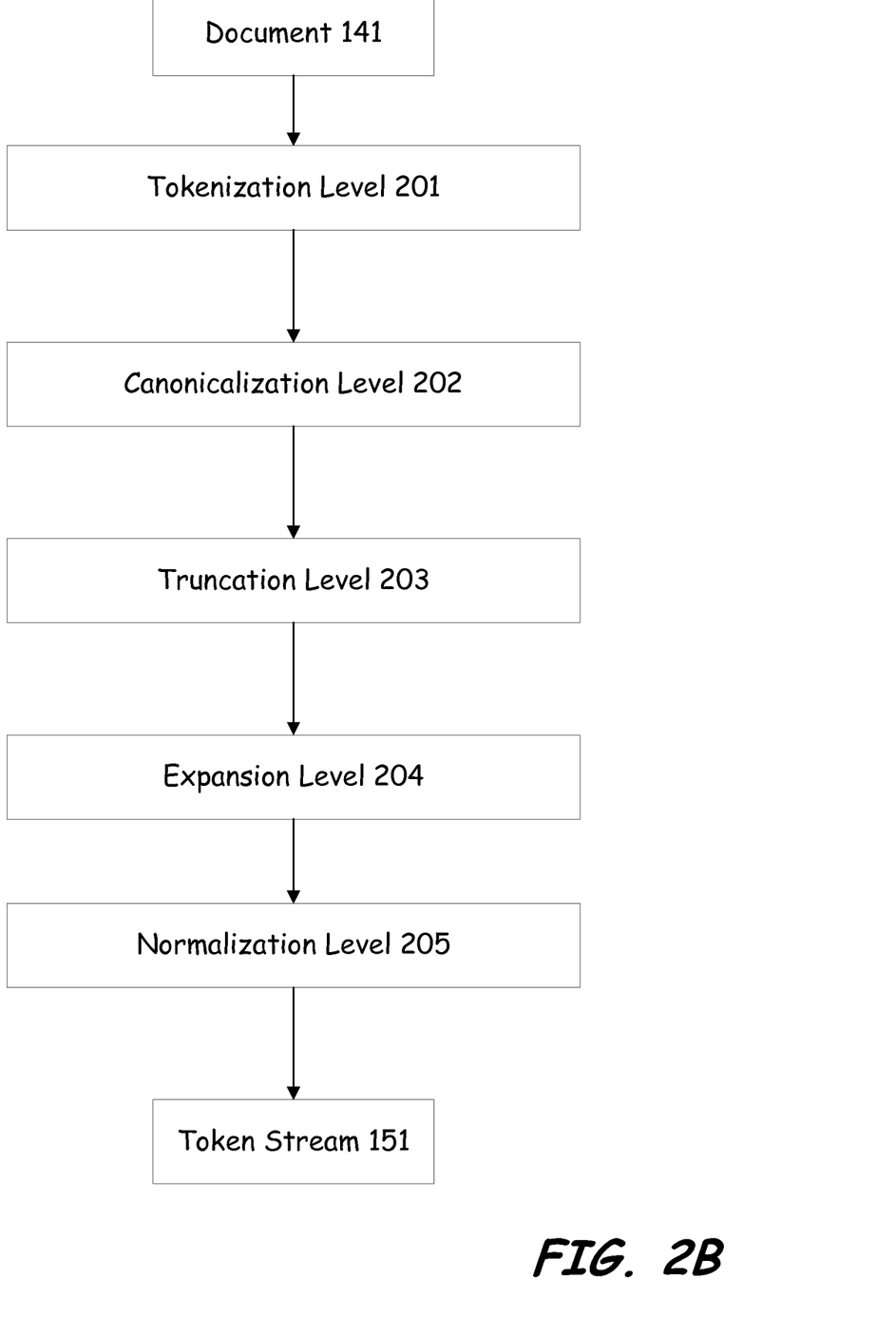
FIG. 2B is a block diagram illustrating an organization of the filters of FIG. 2A according to a basic functionality of the filters according to one illustrative embodiment.

FIG. 2B is a block diagram illustrating an organization of the filters 210-290 according to a secondary approach to the application of the filters to the preprocessed document 141 according to one illustrative embodiment. At the first level 201 the preprocessed document 141 is tokenized into a token stream using the tokenizer 210. At the next level 202 is the canonicalization of the token stream. At level 202 filters 220, 230 and 260 are grouped. However it should be noted that other types of filters which promote canonicalization may also be present at this level. At level 203 is the truncation of the token stream. Level 203 includes the stop word filter 250. However, any other filters may be applied in this level that results in the reduction in the overall size of the token stream by removing or combining tokens in the query. At level 204 is the expansion level. This level includes filters for the named-entity 240, first synonym filter 270 and second synonym filter 280. However, other filters which expand the terms in the token stream by including additional information based on the information in the token stream may also be present at this level. The final level 205 is the normalization level. At this level the stem filter 290 is located. However, any other filter that can normalize terms in the token stream may be present at this level as well. The output of the system is the enhanced token stream 151. The discussion now returns to FIG. 2A to discuss the features of the various filters in the analyzer 150. Again note that any number of these filters may be present in the analyzer 150.

Tokenizer 210 takes the article and converts the plain text in to smaller atomic units that will be processed further to generate the enhanced token stream 151 for indexing. The tokenization process typically occurs at the word level in the document. However, it is often difficult for a system to know what a word actually is. As such, the tokenizer 210 in some embodiments employs heuristics to identify the words to be tokenized. The heuristics can include tokenizing at each encountered white space between characters as well as considering all of the encountered punctuation in the article.

Camel case filter 210 is configured to identify within the tokens that are generated by the tokenizer 210 various "camel-case words." Camel case filter 210 expands camel cased words into their constituent words. Camel case words are words that appear in technical documents that often have two or three words combined into a single word. In one embodiment of the present disclosure the camel case filter 210 considers and identifies the following five common cases of camel case words: (1) the standard case 'Camel-Case' is often used for type names ad references in source code or configuration entities e.g., GetMethodName; (2) the interior case 'camelCase' is often used for identifier names e.g., methodName; (3) capital letters at the end 'Came-ICASE' e.g., GetBIT, (4) all capital letters 'CAMELCASE' are often used in abbreviations or boolean bits e.g., ENABLED; and (5) a mixture of camel case and capital letters are often used to include abbreviations inside the word e.g., WeakRSAKeys. Given an input camel case word, this filter 210 outputs the original token along with its constituent words. For instance, 'IsSecurityLogOverwrite' will be converted into [IsSecurityLogOverwrite, Is, Security, Log, Overwrite] to support queries that look for the camel-cased representation or its constituent words. However, other instances of camel case words can be identified and processed by the camel case filter Value type filter 230 is configured to identify from the tokens the value type associated with a token to provide further hints related to encountered numbers. This typically occurs in articles that discuss certain software versions or specific system set ups. For example an article may state "In SQL, if the number of logical processors is less than or equal to 8, set the InMemory bit to true . . . ." The value type filter 220 adds to the index stream a token for Numeric or Boolean at the same position in the token stream as the identified value token. Thus, the value type filter 220 detects numerals, true/false and version numbers. Additional values such as Enumerations may also be detected and identified by the value type filter 220. Thus, in the example the value type filter 220 would output "In SQL, if the number of logical processors is less than or equal to 8 NUMERIC, set the InMemory bit to true BOOLEAN . . . ." In some embodiments the value type filter 220 is able to identify and resolve comparison features in the token stream. For example, the value type filter may identify the words "greater than or equal to" and identify it with an identifier that notes that this is a comparative token in the token stream and also notes the mathematical function associated with the comparative feature such that during a query the comparative feature can be evaluated for determination of truth matching. Other comparative features may be identified by the value type filter 220 such as "equal to" "set to" "greater than" "less than" etc.

Lower case filter 260 is a filter that simply outputs a lower cased version of an identified token. Thus, in the example "SQL" is converted to a second token "sql" which is then added to the list of tokens for the article. By removing the capitalization from the token stream it becomes easier to identify words when a user later inputs a query against the knowledge base. It should be noted that when the lower case filter is present along with the camel case filter 210, the camel case filter 210 should be applied before the lower case filter 260. This allows for the preservation of the information associated with a camel case word that would be lost and expansion of the camel case word becomes difficult at best.

Stop word filter 250 is applied to the token stream to remove frequently occurring words from the string. In one embodiment stop word filter 250 uses a list of the most frequently occurring common words in the natural language which the documents are being indexed against. For example in English words such as "a" "an" "and" "the" "is" "are" "my" "our" etc. will be removed from the token stream. Additionally certain words that are common in the subject matter of the knowledge base may also be removed. This list of words could be provided to the system from a developer or organization that helps identify words that typically would not be removed, but because of the subject matter may create more noise than value to a person looking for the information.

Named entity filter 240 is a filter that is configured to identify named-entities in the token stream. For example if the document states "Install SQL Server on your machine." It becomes helpful to identify and recognize that "SQL Server" is a named entity and not two separate unrelated words. The named entity filter 240 modifies the token order information of the token stream so that the words "SQL Server" are identified as a single token and not two separate tokens.

The named entity filter 240 obtains a list of named entities from a domain expert where the named entities have been mapped to an ontology model to identify other features that are common to the named entities. For example "SQL Server" and "logical processors" may be tagged as "Software Entity" in the ontology model. This list of named entities may also be created automatically or automatically in conjunction with a domain expert. Such as discussed in U.S. patent application Ser. No. 13/535,366 by Navendu Jain et al, entitled "PROBLEM INFERENCE FROM SUPPORT TICKETS" the contents of which are hereby incorporated by reference in their entirety.

Given the list of named-entities, the named-entity filter 240 in one embodiment builds a graph as a pre-processing step to enable fast lookups. In this graph, nodes denote words and edges connect words if they occur together in a phrase in the named-entity list. For instance, given the words [sql, sql server, sql server database, sql server 2005], the final graph will contain four nodes (sql, server, database, 2005), an edge from sql→server, server→database, and server→2005.

Table 1 (below) shows how named entities are recognized at index-time and is implemented as part of the Named-Entity Filter. For each input token, its position is recorded in TokenPosition (L4). The ExistsAsEntity function on L5 is used to check if the token exists as an entity i.e., whether the graph consists of a node having TOKEN as its value. If it does, then a check is made (using ExistsAsNeigbor function in L11) to see if the next token (L10) exists as a neighbor of TOKEN in the graph. If it does, then it is concatenated with the previous token and pushed onto a stack. The algorithm will continue to execute as long as the next token exists as a neighbor of the previous token. Once this condition is violated, the stack is popped and the concatenated string will be given the token position of TokenPosition from L4.

TABLE 1

Index-time Named-Entity Recognition

Require: Pre-processed database of word automatons, Token stream
Output: Group of tokens recognized as named-entities
1: Initially:
2: TOKEN ←Current token
3: STACK ←InitializeStack( )
4: TokenPosition = GetTokenPosition( )
5: while ExistsAsEntity(TOKEN) do
6: CurrentTerm = TOKEN
7: if IsEmpty(STACK) == 1 then
8: STACK.Push(CurrentTerm)
9: end if
10: NextTerm = IncrementToken( )
11: if ExistsAsNeigbor(CurrentTerm,NextTerm) == 1 then
12: CurrentTerm = STACK.Pop( )
13: STACK.Push(CurrentTerm+NextTerm)
14: else
15: NextTermBu f f er = NextTerm
16: end if
17: end while
18: STACK.Pop( )
19: TOKEN.SetPosition(TokenPosition Synonym filter 270 is a filter that is applied to the token stream to identify words or synonyms in the token stream that could be related to the words on a domain specific level. The filter 270 expands the token stream when it finds words that are related. This approach is especially helpful in the domain specific knowledge bases as the synonyms don't change very often and storing this information in the index is not costly. Further by storing in the index it is possible to reduce query latency. The synonym filter 270 works similar to the way that name-entity filter 240 works, and the synonym filter is illustrated in Table 2 below. However, instead of using the graph of the named entity filter 240 the synonym filter uses two hash tables. The first hash table contains words as keys and their associated synonym group identifier as the value. The second hash contains the synonym group identifiers as keys and the set of all synonyms in that group as values. When the synonym filter 270 identifies a token in the string it injects all synonyms in that group as values. However, in other embodiments additional logic may be employed to filter out those synonyms that are not relevant to the document. The synonyms are then inserted into the token stream at the positional value of the identified token. In an alternative embodiment, the synonyms may not be directly inserted into the token stream, but referenced in a table and the corresponding index or id for the synonyms is inserted into the token stream at the position of the token.

TABLE 2

Index-time Synonym Expansion

Require: Synonym groups, Token stream
Output: Token stream injected with associated synonyms
1: Initially:
2: TOKEN ←Current token
3: STACK ←InitializeStack( )
4: if HasSynonyms(TOKEN) == 1 then
5: STACK.Push(GetSynonyms(TOKEN))
6: TokenPosition = GetTokenPosition( )
7: end if
8: while STACK is not empty do
9: In jectNewToken(STACK.Pop( ),TokenPosition)
10: end while Second synonym filter 280 is a filter that is configured to take the token stream and add to the string common synonyms for words in the token stream. In one embodiment the second synonym filter makes use of the WordNet, G. A. Miller's Wordnet: a Lexical Database for English. Communications of the ACM, 38(11):39-41, 1995, for identifying additional words to be added to the string as synonyms. However, any list of synonyms for the language in question can be used for this expansion of terms. These identified synonyms are then added to the string in the positional location of their corresponding token.

The stem filter 290 is a filter that is configured to remove or convert words to their base forms. As such the stem filter 290 is employed to return the word back to its base form. For example, an article describing "upgrading your software" and an article about "upgradation of a software module" are both likely to represent the same concept, that is "upgrade". The stem filter in one embodiment employs the Porter stemming algorithm. The Porter stemming algorithm is a process for removing the more common morphological and inflexional endings of words. However, any method for identifying and stemming words can be used.

Indexer 160 receives from the analyzer the final token stream 151 for the article in question. The token stream 151 having been passed through one or more of the filters 210-290 is now associated with the article as the article's index. This index is then stored with the parent documents 101 in the knowledge base database 110 where it can be later retrieved during a search or query.

Figure 3:
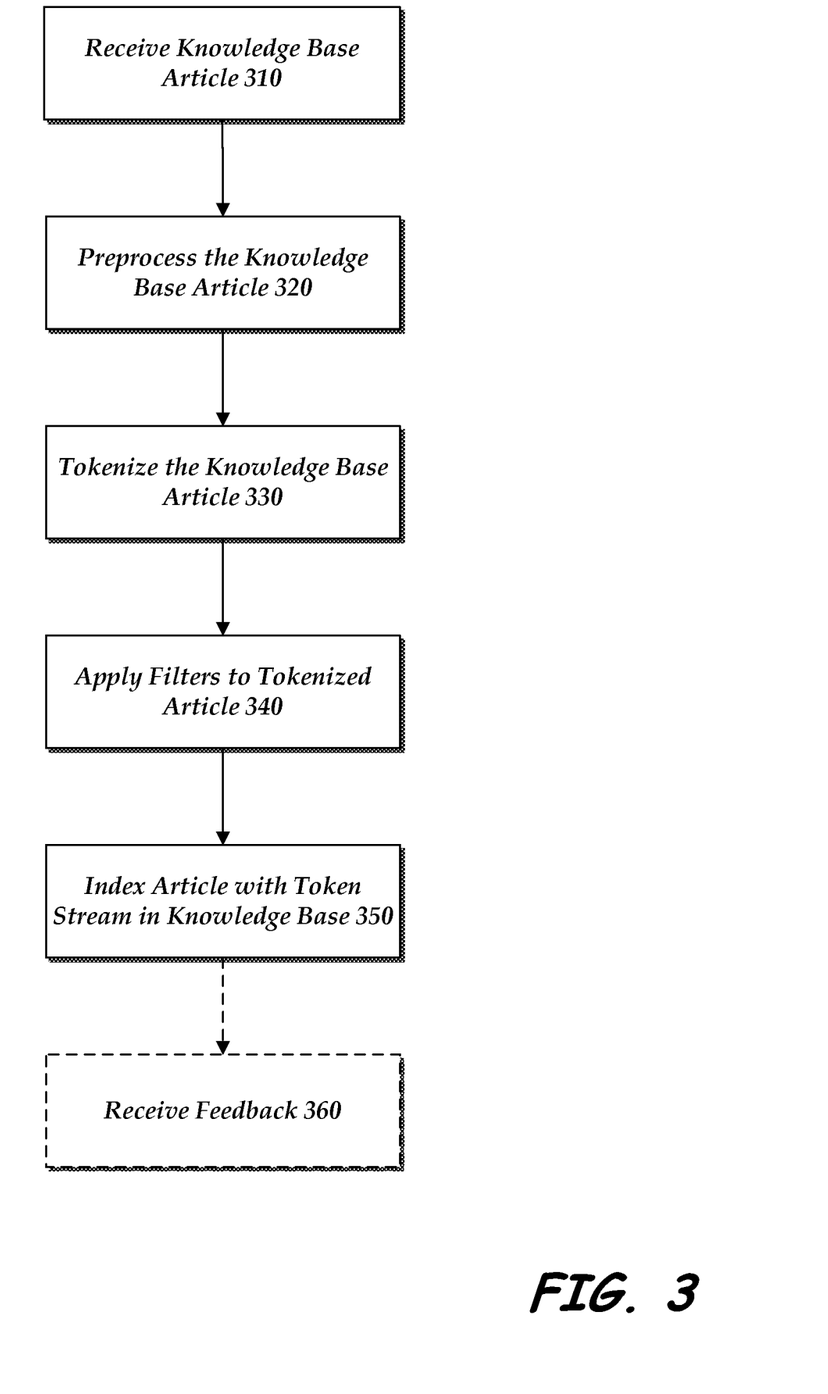
FIG. 3 is a flow diagram illustrating the process of using the generating the enhanced index according to one illustrative embodiment.

FIG. 3 is a flow diagram illustrating a process for indexing knowledge based documents by identifying and building additional features in the index for the document. This is also referred to as knowledge building.

Knowledge based articles 101 are identified, received, and/or provided to the system. This is illustrated at step 310. The articles can be generated by developers during the development of programs, by customer service agents responding to customer complaints or problems in using a particular piece of software, by subject matter experts who are familiar with the workings of a particular product, from an online bulletin board system of knowledge based articles or responses to a posted problem, a person who has figured out and written about a problem or feature of a product, or any other means or method of generating the knowledge based articles. The common link between all of these authors is that they produce a document that can be consumed by an end user to better configure or use a particular software product. While the present discussion addresses software or computer based knowledge base systems, the ideas presented herein can be applied equally as well to other areas that use knowledge based articles such as automobiles, home electronics, boats, cooking, etc. Alternatively the configuration snapshot 121 may be received or provided at this step.

Once the article 101 or articles have been identified and provided to the system at step 310 the system proceeds to preprocess the article. This is illustrated at step 320. The preprocessing step linearizes the text in the article by removing from the article tags and other extraneous document data such as HTML tags so that the article is now, for example, in a plain text format. Any method by which the article can be converted to plain text may be used at step 320 By converting the article to plain text it is now possible to perform the indexing process of the present disclosure.

Once the article is in plain text the text is passed through a tokenizer, such as tokeninzer 210, at step 330 to generate a token stream. The tokenizer splits the text into smaller atomic units or tokens that will be further processed by the system in generating the enhanced token stream 151 used for the index of the document in the knowledge base 110. The process of tokenizing the text can be performed by any method or process that creates tokens from words that can be used for indexing or searching of a document. Tokenizing of the text identifies words or groupings of the words in the document.

After the text has been tokenized the tokens and the token stream is passed through at least one filter. The step of filtering the tokens and the token stream is illustrated at step 340. Filtering of the tokens in the token stream helps create a cleaner index that can be used later for searching of the knowledge base of articles to find more relevant articles to a received query. Each of the filters that the tokens pass through perform specific actions on the tokens and the token stream in building the enhanced token stream for indexing the document. For example the filters may remove overly common or repetitive words from the document such as "a" "the" or may add additional words to the token stream such as adding synonyms for various tokens to the token stream. As discussed above with respect to FIG. 2 any number of the filters may be present and used at the filtering step 340.

The filtering step outputs an enhanced token stream such as token stream 151 for each document that is processed through. This enhanced token stream is mated with the original document 101 as the index for the document. The indexed document is then stored in knowledge base 110. This is illustrated at step 350.

Users of the system may provide feedback to the system such that the index for the documents can be better enhanced. Feedback is provided at step 360. This feedback can be based on the users identifying additional words that are related to the particular problem. Conversely this feedback can include a listing of words or concepts that don't apply to the particular article. In this approach the system is able to learn and tune the various filters that it applies to a token stream to achieve better results to the user of the system. These inputs can include white lists of terms or features that should always be included, black lists of terms that should always be excluded and named entities where the users identifies for the system specific terms that should be considered as named entities. This user feedback is incorporated in to the corresponding filter to enhance that filter. In some embodiments the feedback may simply modify the index with or without tuning the corresponding filters.

The present disclosure in some embodiment results in the building an inverted index that stores the extracted terms from a document or article in a form suitable for rapid retrieval. The present disclosure uses an inverted index, a word-oriented mechanism, for indexing a text collection in order to speed up the searching task. The inverted file structure is, in one embodiment, composed of two elements: vocabulary and meta-information. The vocabulary is the set of all different tokens in the text. For each such token, additional pieces of information, called meta-information is stored. Meta-information is usually used when scoring a retrieval task. The present disclosure stores the list of all the text positions where the token appears (this is referred to as positional information—Token positions (i.e., position k refers to the k-th token) to simplify phrase and proximity queries (token x near token y)), a list of all documents where the token appears, and the number of times a token appeared in a document (called term frequency). An example of an inverted index is illustrated in Table 3.

TABLE 3

| Term | Position | Documents | Frequency |
|------|----------|-----------|-----------|
| In | {1:1} | 1 | 1 |
| SQL | {1:2} | 1 | 1 |
| logical | {1:[7, 24]} | 1 | 2 |
| processors | {1:8, 25]} | 1 | 2 |

Figure 4:
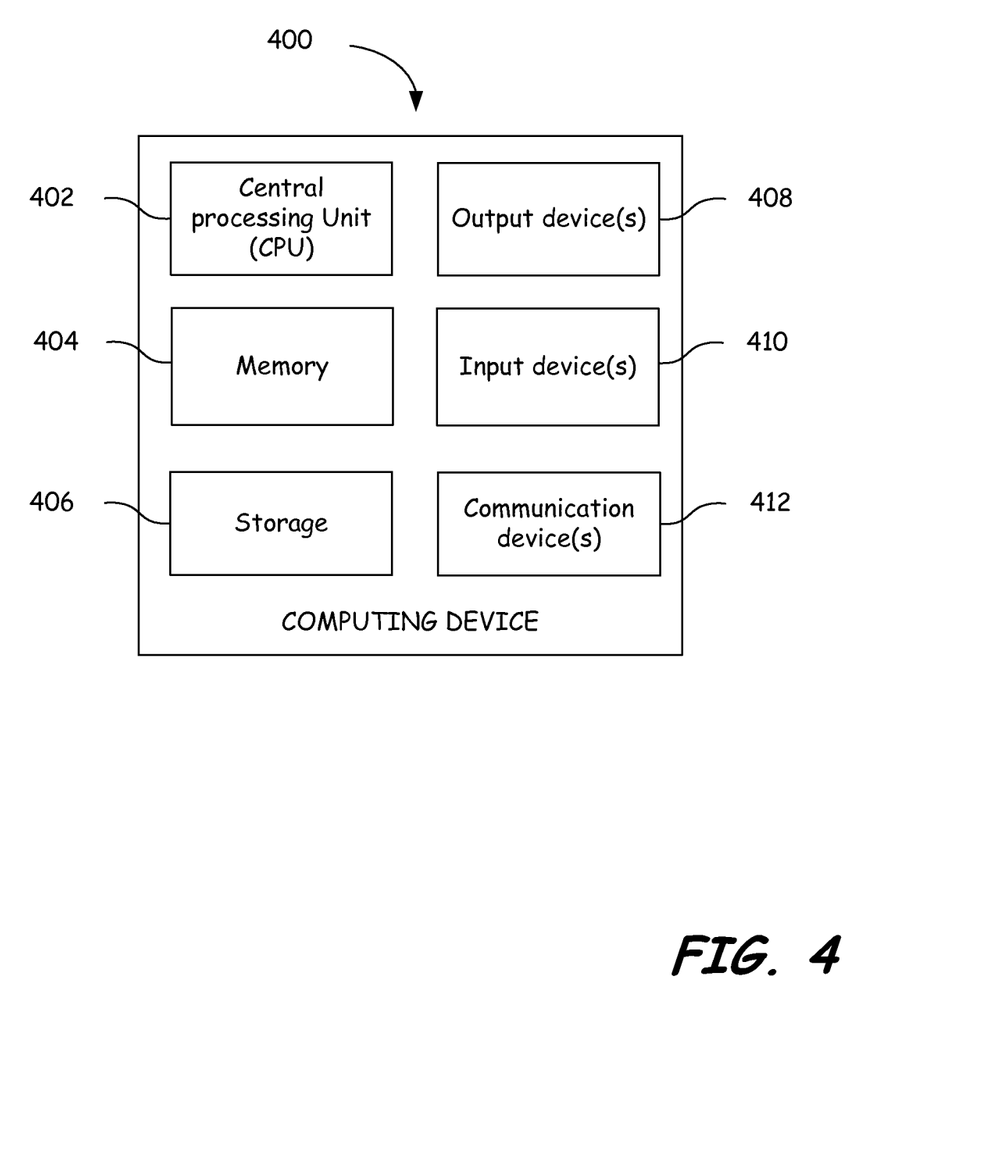
FIG. 4 is a block diagram illustrating a computing device which can implement the enhanced indexing system according to one embodiment.

FIG. 4 illustrates a component diagram of a computing device according to one embodiment. The computing device 400 can be utilized to implement one or more computing devices, computer processes, or software modules described herein. In one example, the computing device 400 can be utilized to process calculations, execute instructions, receive and transmit digital signals. In another example, the computing device 400 can be utilized to process calculations, execute instructions, receive and transmit digital signals, receive and transmit search queries, and hypertext, compile computer code, as required by the system of the present embodiments. Further, computing device 400 can be a distributed computing device where components of computing device 400 are located on different computing devices that are connected to each other through network or other forms of connections. Additionally, computing device 400 can be a cloud based computing device.

The computing device 400 can be any general or special purpose computer now known or to become known capable of performing the steps and/or performing the functions described herein, either in software, hardware, firmware, or a combination thereof.

In its most basic configuration, computing device 400 typically includes at least one central processing unit (CPU) or processor 402 and memory 404. Depending on the exact configuration and type of computing device, memory 404 may be volatile (such as RAM), non-volatile (such as ROM, flash memory, etc.) or some combination of the two. Additionally, computing device 400 may also have additional features/functionality. For example, computing device 400 may include multiple CPU's. The described methods may be executed in any manner by any processing unit in computing device 400. For example, the described process may be executed by both multiple CPU's in parallel.

Computing device 400 may also include additional storage (removable and/or non-removable) including, but not limited to, magnetic or optical disks or tape. Such additional storage is illustrated in FIG. 4 by storage 406. Computer storage media includes volatile and nonvolatile, removable and non-removable media implemented in any method or technology for storage of information such as computer readable instructions, data structures, program modules or other data. Memory 404 and storage 406 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 400. Any such computer storage media may be part of computing device 400.

Computing device 400 may also contain communications device(s) 412 that allow the device to communicate with other devices. Communications device(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 400 may also have input device(s) 410 such as keyboard, mouse, pen, voice input device, touch input device, etc. Output device(s) 408 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A computer-implemented method that improves a search engine's ability to output results for a given query by generating an enhanced token stream used to index a document stored at a knowledge base, the computer-implemented method being performed by one or more processors running executable instructions, and the computer-implemented method comprising:
   receiving a token stream comprised of atomic units that represent tokens corresponding to words or phrases derived from a document formatted in plain text;
   enhancing the token stream by applying an expansion filter that identifies words in the token stream that are related to each other and are identified as at least two distinct tokens in the token stream, wherein identifying words in the token stream that are related to each other comprises:
   determining if a token in the token stream exists as an entity in a named entity list;

determining if a next token in the token stream exists as a connected entity in the named entity list when the token is determined to exist in the named entity list; and repeating the steps until the next token does not exist as a connected entity in the named entity list; and combining the at least two distinct tokens into a single token in the token stream;

indexing and storing as an inverted index the received document with the enhanced token stream in a knowledge database; and using the indexed document to provide a response to a given query.

2. The computer-implemented method of claim 1, wherein enhancing the token stream further comprises one or more canonicalization filters that perform at least one of the following:

expand one or more camel-case words into corresponding constituent words added to the token stream;

identify for one or more tokens a value type which is added to the token stream; and generate and add to the token stream a lower case version of an identified token.

3. The computer-implemented method of claim 2 wherein one of the one or more canonicalization filters comprises a camel case filter which expands the one or more camel-case words into corresponding constituent words added to the token stream by performing the following:

splitting the camel-case words into their constituent words; and inserting the constituent words into the token stream at a position corresponding to the identified camel-case words.

4. The computer-implemented method of claim 2 wherein one of the one or more canonicalization filters comprises a lowercase filter that converts all uppercase letters in the tokens to lowercase letters.

5. The computer-implemented method of claim 1 wherein enhancing the token stream further comprises one or more other expansion filters that identify the one or more synonyms, the one or more other expansion filters comprising:

a first synonym filter configured to:
identify words in the token stream that are related to a group of words on a domain specific level; and
insert the group of words into the token stream at a position in the token stream as the identified word; and a second synonym filter configured to:
identify words in the token stream that have at least one synonym and are not related to the group of words; and
insert the at least one synonym into the token stream at a position in the token stream as the identified word.

6. The computer-implemented method of claim 5 wherein at least one other expansion filter is configured to identify an addition to the token stream of one or more synonyms corresponding to tokens in the token stream.

7. The computer-implemented method of claim 1 wherein enhancing the token stream further comprises a normalization filter comprising a stem filter that return the corresponding words for one or more tokens to the base form.

8. A computer readable storage device storing computer executable instructions that when executed by a processor cause the processor to implement a method for improving a search engine's ability to output results for a given query by generating an enhanced token stream used to index a document stored at a knowledge base, and wherein the stored documents relate to configuration or other system errors of a computing system, and the computer-implemented method comprising:

receiving a token stream comprised of atomic units that represent tokens corresponding to words or phrases derived from a document formatted in plain text;

enhancing the token stream by applying an expansion filter that identifies words in the token stream that are related to each other and are identified as at least two distinct tokens in the token stream, wherein identifying words in the token stream that are related to each other comprises:

determining if a token in the token stream exists as an entity in a named entity list;

determining if a next token in the token stream exists as a connected entity in the named entity list when the token is determined to exist in the named entity list; and repeating the steps until the next token does not exist as a connected entity in the named entity list; and combining the at least two distinct tokens into a single token in the token stream;

indexing and storing as an inverted index the received document with the enhanced token stream in a knowledge database; and using the indexed document to provide a response to a given query.

9. The computer readable storage device of claim 8, enhancing the token stream further comprises one or more canonicalization filters that perform at least one of the following:

expand one or more camel-case words into corresponding constituent words added to the token stream;

identify for one or more tokens a value type which is added to the token stream; and generate and add to the token stream a lower case version of an identified token.

10. The computer readable storage device of claim 9 wherein one of the one or more canonicalization filters comprises a camel case filter which expands the one or more camel-case words into corresponding constituent words added to the token stream by performing the following:

splitting the camel-case words into their constituent words; and inserting the constituent words into the token stream at a position corresponding to the identified camel-case words.

11. The computer readable storage device of claim 9 wherein one of the one or more canonicalization filters comprises a lowercase filter that converts all uppercase letters in the tokens to lowercase letters.

12. The computer readable storage device of claim 8 wherein enhancing the token stream further comprises one or more other expansion filters that identify the one or more synonyms, the one or more other expansion filters comprising:

a first synonym filter configured to:
identify words in the token stream that are related to a group of words on a domain specific level; and
insert the group of words into the token stream at a position in the token stream as the identified word; and a second synonym filter configured to:
identify words in the token stream that have at least one synonym and are not related to the group of words; and
insert the at least one synonym into the token stream at a position in the token stream as the identified word.

13. The computer readable storage device of claim 12 wherein at least one other expansion filter is configured to identify an addition to the token stream of one or more synonyms corresponding to tokens in the token stream.

14. The computer-implemented method of claim 8 wherein enhancing the token stream further comprises a normalization filter comprising a stem filter that return the corresponding words for one or more tokens to the base form.

15. A computing system comprising:
one or more processors;
one or more hardware storage device storing computer executable instructions that when executed by the one or more processors cause the computing system to be configured with an architecture that improves a search engine's ability to output results for a given query by generating an enhanced token stream used to index a document stored at a knowledge base, and wherein the architecture comprises:
a knowledge discovery module that receives a document;
a preprocessing component that preprocesses the received document by removing article tags and other extraneous document data to format the received document in a plain text format whenever the received document is not already in a plain text format when received at the discovery module;
an analyzer module that processes the received document once it is in a plain text format, and generates an enhanced token stream for the received document, by performing the following:
at a tokenizer, converting the plain text into smaller atomic units that represent tokens corresponding to words or phrases and wherein the tokens form a token stream;
enhancing the token stream by applying an expansion filter that identifies words in the token stream that are related to each other and are identified as at least two distinct tokens in the token stream, wherein identifying words in the token stream that are related to each other comprises:
determining if a token in the token stream exists as an entity in a named entity list;
determining if a next token in the token stream exists as a connected entity in the named entity list when the token is determined to exist in the named entity list; and
repeating the steps until the next token does not exist as a connected entity in the named entity list; and
combining the at least two distinct tokens into a single token in the token stream;
indexing the document with the enhanced token stream in a knowledge database; and
using the indexed document to provide a response to a given query.

16. The computing system of claim 15 further comprising one or more canonicalization filters that expand one or more camel-case words into corresponding constituent words added to the token stream, and wherein the one more canonicalization filters comprises a camel case filter configured to:
identify camel case tokens in the token stream;
split each camel case token into constituent words; and
insert the corresponding constituent words into the token stream as tokens at a position corresponding to each identified camel case word.

17. The computing system of claim 16 wherein the one or more canonicalization filters comprises a value type filter configured to insert a value identifier as a token into the token stream at a position corresponding to the identified value in the token stream.

18. The computing system of claim 17 wherein the value type filter identifies as values numerical values and Boolean values.

19. The computing system of claim 15 wherein the one or more canonicalization filters comprises a lower case filter that modifies the token stream by converting uppercase letters in the plurality of tokens to lowercase letters.

20. The computing system of claim 15 wherein the expansion filter comprises a named entity filter configured to add to the token stream an ontology model identifier at a position corresponding to the single token.

21. The computing system of claim 15 further comprising a synonym filter configured to:
identify words in the token stream that are related to a group of words on a domain specific level; and
insert the group of words into the token stream at a position in the token stream as the identified word.

22. The computing system of claim 21 further comprising a second synonym filter configured to:
identify words in the token stream that have at least one synonym; and
insert the at least one synonym into the token stream at a position in the token stream as the identified word.

* * * * *